Inventor
Francis A. Helin.
by
Atty's.

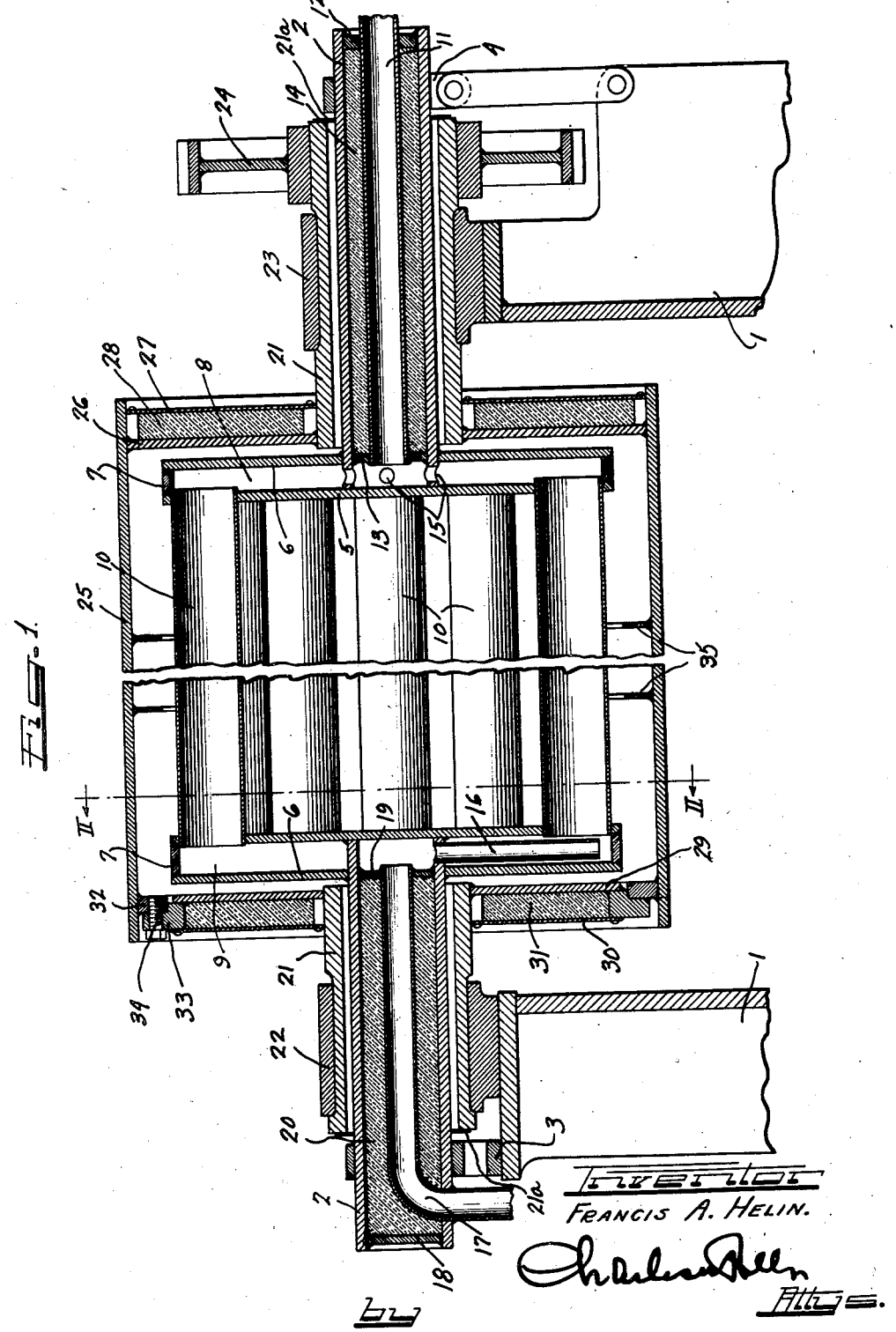

Jan. 16, 1945. F. A. HELIN 2,367,578
ROTARY DRIER
Filed Sept. 14, 1942 3 Sheets-Sheet 3
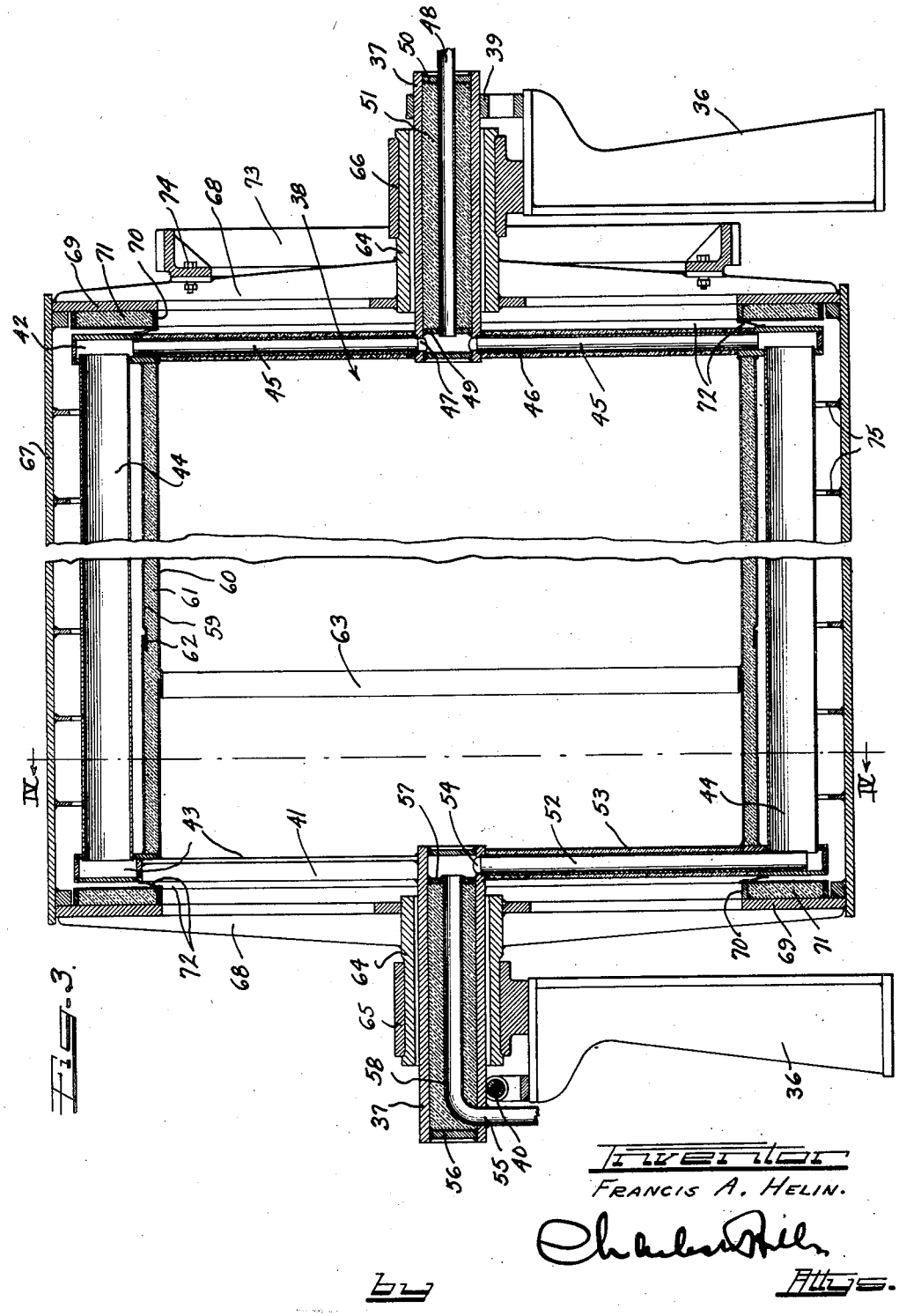
Inventor
Francis A. Helin.
by Charles Hill
Attys.

Patented Jan. 16, 1945

2,367,578

UNITED STATES PATENT OFFICE 2,367,578

ROTARY DRIER

Francis A. Helin, Watertown, N. Y.

Application September 14, 1942, Serial No. 458,190

4 Claims. (Cl. 257—93)

This invention relates to improvements in a rotary drier, and more particularly to a cylindrical drier for use in connection with the manufacture of paper, cloth, dry milk, various dried food products, various forms of other sheet materials, etc., although the invention may have other uses and purposes as will be apparent to one skilled in the art.

In the past, driers of the rotary cylindrical type have more frequently been made out of cast iron or equivalent material. Steam was conducted directly into the rotary cylinder, and naturally steam joints of many and various types were employed to conduct both steam and condensate. Such drier cylinders were highly objectionable in that the shells were seldom finished on the inside, varied in thickness, and thus gave uneven and non-uniform heating over the outer surface in contact with the material to be dried. Also, there was danger of explosion due to added steam pressure, and the weight of the cylinders, in order to withstand the necessary steam pressure, was highly objectionable. In addition, it may be mentioned that the steam joints after relatively short usage permitted leakage and were undesirably expensive to both construct and maintain. Condensation was also difficult of removal from a rotating cylinder because of the condensation tending to follow the walls of the drum by virtue of centrifugal force so that much of the condensate, or a good part of it, could never be removed during operation, and the whirling condensate acted in the nature of a brake to the rotation of the shell or drum.

With the foregoing in mind, it is an important object of the present invention to provide a rotary drier which is preferably of welded steel construction, or the equivalent.

Another object of the invention is the provision of a rotary drier in which the drying shell carries no steam pressure, consequently can be made very much lighter in weight, and a relatively thin shell may be used.

It is also an object of this invention to provide a rotary drier in which the walls of the drying shell are of even thickness and finished on the inside, and consequently excellent heat conduction results.

In addition, it is an object of this invention to provide a rotary drier so constructed that steam is only admitted to non-rotating parts with the consequent elimination of steam joints, since all such connections may be permanent and fixed. Cost of maintenance is thereby reduced, and power saved.

Another feature of the invention resides in the provision of a rotary drier which, due to the fact that the outer shell carries no internal pressure, and due to the fact that the steam or other heating element is totally confined within stationary mechanism alone, is quite safe and danger of explosion is eliminated.

Still another feature of the invention resides in the provision of a rotary drier utilizing steam as a heating agent, and from which condensation is very easily removed, even while the drier is in very rapid operation, because such condensation only collects in stationary parts.

It is also a feature of this invention to provide a rotary drier wherein condensation provides no braking effect on the rotation of the working shell of the drier.

In addition, it may be mentioned that the present invention also seeks the provision of a rotary drier in which the working shell may be extremely light in weight, the entire drier may be run with a minimum of power usage, maintenance is at a minimum, joint repairs or replacements are unnecessary, and the entire construction is highly durable and economical to manufacture.

While some of the more salient features, characteristics and advantages of the instant invention have been above pointed out, others will become apparent from the following disclosures, taken in conjunction with the accompanying drawings, in which:

Figure 1 is a fragmentary vertical sectional view taken longitudinally through a rotary drier construction embodying principles of the instant invention, the structure in this figure being of a relatively wide drier with a relatively small diameter;

Figure 3 is a fragmentary vertical sectional view taken longitudinally through a rotary drier construction embodying principles of the present invention, and illustrating in this instance a relatively narrow drier of relatively large diameter.

As shown on the drawings:

Figure 2:
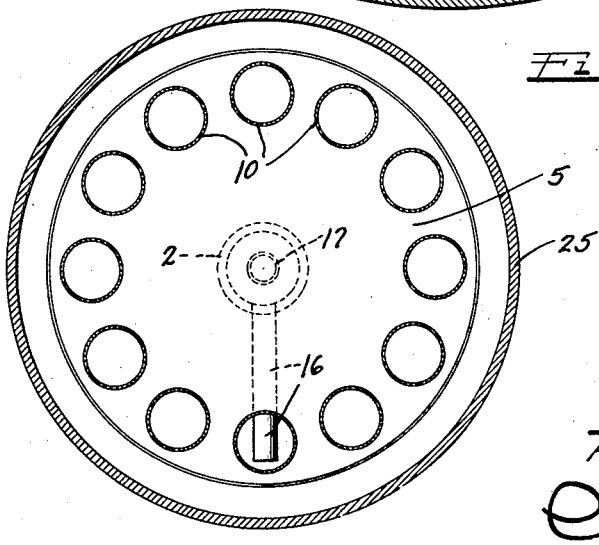
Figure 2 is a transverse vertical sectional view of the structure of Figure 1 taken substantially as indicated by the line II—II of Figure 1, looking in the direction of the arrows.

In that illustrated embodiment of the present invention illustrated in Figures 1 and 2, there is seen a suitable supporting base or frame 1 upon which the rotary drier construction is mounted. Both the stationary and rotary portions of the complete device are preferably carried on the same frame but are supported on different bearings.

At the outset, it may be best to mention that in the construction of my rotary drier the preferred material is steel, and wherever possible in the fabrication of the structure the parts are preferably welded together. Such welding is indicated in the drawings by solid fillets at various connection points, and so specific description of each and every welded connection throughout this specification is unnecessary. The advantages of a welded steel construction are quite apparent to one skilled in the art, as well as being apparent from the aforesaid objects of the invention and from the later description herein.

As stated above, all of the parts of the device into which steam may enter directly are stationary except, of course, for a slight movement that may result from expansion and contraction due to changes in temperature. The parts actually associated with live steam include a stationary hollow shaft 2 carried in a fixed bearing 3 near one end thereof, and a shiftable bearing 4 adjacent the other end to allow for movement due to expansion and contraction. This hollow shaft 2 is divided into left and right portions, the inner ends of which are integrally secured to a steam radiator or drum 5 so that the drum actually functions as the central part of the shaft. As indicated at 6, the drum is double-walled at each end thereof and sealed between the walls by a ring 7 to provide a live steam header 8 at one end of the drum and a condensate header 9 at the other end of the drum. Paralleling the axis of the drum 5 and in open communication with both of the headers 8 and 9 is a circumferential series of steam pipes 10. These pipes 10 are preferably of relatively thin steel or other material of good strength and conductivity so that the pipes may readily radiate heat in a radial direction with respect to the drum, the pipes, in effect, forming the body portion of the drum.

Through one of the portions of the shaft 2 (the right hand portion as seen in Figure 1) a steam pipe 11 extends, and the hollow shaft is plugged around the pipe 11 at the outer end as indicated at 12, and at the inner end as indicated at 13. Between the plug the hollow shaft is preferably filled with heat insulating material 14 to avoid useless dissipation of heat provided by the steam passing through the pipe 11. It will be seen that the end portion of the shaft 2 extends to the inner wall of the header 8, and inside the header the shaft is provided with a number of apertures 15 through which steam emanating from the pipe 11 may be discharged into the header.

From the header 8 the steam passes through the series of pipes 10 to the header 9. From the header 9, however, there is no escape for the steam into the other portion of the hollow shaft 2 (the left hand portion as seen in Figure 1). The only outlet through this other portion of the shaft 2 is by way of a downwardly extending condensate syphon pipe 16 which communicates through the under portion of the hollow shaft 2 and extends downwardly to a position just above the bottom of the header and adjacent end of the lowermost steam pipe 10. As the steam condenses, the condensate will accumulate in the lower portion of the header 9 and in the lowermost steam tube or pipe 10. From this location the condensate may easily be syphoned out through the pipe 16, the inner hollow part of the shaft 2, and through a pipe 17 extending through this portion of the hollow shaft 2. As seen best in Figure 1, the pipe 17 curves out of the shaft 2 in a downward direction to better facilitate the syphoning operation. This part of the shaft 2 is preferably completely blocked at its outer end as indicated at 18, plugged around the inner end of the syphon pipe 17, as indicated at 19, and is packed with heat insulating material 20 between the plugs and around the pipe 17.

It will be especially noted that all of the above described structure is stationary. Consequently, the condensate accumulates in the form of a quiet pool from which it may be very easily and very readily syphoned, regardless of whether the moving parts to be later described are in operation or not. It will further be noted that no steam joints, specialized packing glands or any such structure are necessary. All of the steam carrying portions of the apparatus are in the nature of permanent connections, and they may simply be welded, brazed, or otherwise firmly secured in position. Any steam leakage is highly improbable, and consequently throughout the ordinary life of the structure any maintenance of the steam connections and heating drum 5 will be negligible.

The rotary portion of the drier construction includes another divided and hollow shaft 21 mounted for rotation in suitable bearings 22 and 23 disposed adjacent opposite ends of the shaft. This shaft also carries a drive gear 24 or the equivalent for driving rotation of the shaft, this gear being associated with any feasible driving mechanism. Preferably the hollow shaft 21 surrounds the previously discussed stationary hollow shaft 2, but is kept separated from the shaft 2 by the bearing mountings.

Forming in effect the intermediate part of the hollow shaft 21 is a rotary shell construction including a heat imparting shell 25 of cylindrical form which shell is actually in contact with the substance to be dried. This shell is preferably made of steel plate of substantially uniform thickness throughout, and which, because it is not subjected to any internal pressure, may be of relatively thin construction so that it will have extremely high heat conductivity. Being of plate metal, the shell already has a finish on the inside surface, and no finishing operation to acquire this advantage is necessary, thus adding to the economy of construction.

The cylindrical shell 25 is provided with an imperforate supporting radial wall 26 connected to the shaft 21. Outside of this supporting wall 26 is a lighter wall 27 spaced away from the wall 26 to provide a space for heat insulation material or packing 28. Similarly, the opposite end of the shell 25 is provided with an inner structural wall 29, an outer lighter wall 30, and heat insulating material or packing 31 disposed therebetween. The heat insulations 28 and 31 are obviously for the purpose of preventing useless dissipation of heat endwise of the shell or drum 25 and thus concentrate heat in a radial direction over the circumferential surface of the shell to that which is being dried. As seen best in Figure 1, the double wall carrying the insulation 31 is mounted on a ring 32 fixed to the inside surface of the drum 25, and includes a rabbeted ring 33 carrying both wall portions 29 and 30, which is bolted as indicated at 34 or equivalently secured in a removable fashion to the supporting ring 32, thereby permitting ready assembly of the structure and easy taking down of the structure if so desired.

If deemed necessary, depending upon the longitudinal length of the drum 5, one or more reinforcing rings 35 may be used, at spaced intervals if there is a plurality of them, to strengthen the intermediate portion of the drum. Air seals 21a of any suitable flexible or resilient material are also preferably provided at the outer ends of shaft sections 21—21 to prevent a circulation of air between the shafts 2 and 21 and between the steam radiator and drying shell.

In operation, the present invention is extremely simple and very effective. Steam is admitted through the pipe 11 to the header 8, thence through the steam tubes 10 to the header 9. As stated above, all of these parts being stationary, there is no need for steam joints or special packing glands, since the various pipes, headers and the like may be permanently connected together as by welding. During use, condensate gathers in the lower of the tubes 10 and in the lower part of the header 9, and this condensate at any time is readily and easily syphoned out through the pipes 16 and 17, the rotation of the drum 25 not interfering at all with the removal of the condensate, and the condensate obviously causes no braking action to the rotation of the drum. Further, substantially all of the condensate is readily removed, since there is none of the condensate tending to follow the wall of the drum by virtue of centrifugal force as would be the case where the steam is admitted directly to the inside of the drum 25.

The tubes 10 may be made relatively thin, since they are preferably of steel, and are possessed of high heat conductivity. By virtue of the rotation of the drum 25, the air between the inner face of the drum and the tubes 10 will not remain stationary and thus function as an insulator, but will be constantly in motion and actually aid in the transference of heat from the tubes 10 to the drum 25. As mentioned above, the shell 25 already has an inside finish and is of uniform thickness, but in view of the fact that there is no internal pressure it may be a relatively thin wall, preferably of steel, and again there is extremely high heat conductivity through the shell. Power consumption is also reduced to a minimum by virtue of the lightness in weight of the drum or shell 25, and because there is clearly no inside load in this shell, relatively little power need be used to rotate it even at rapid speed. It might also be noted that the possibility of an explosion resulting from excess steam pressure is reduced to a negligible minimum by the present invention.

Figure 4:
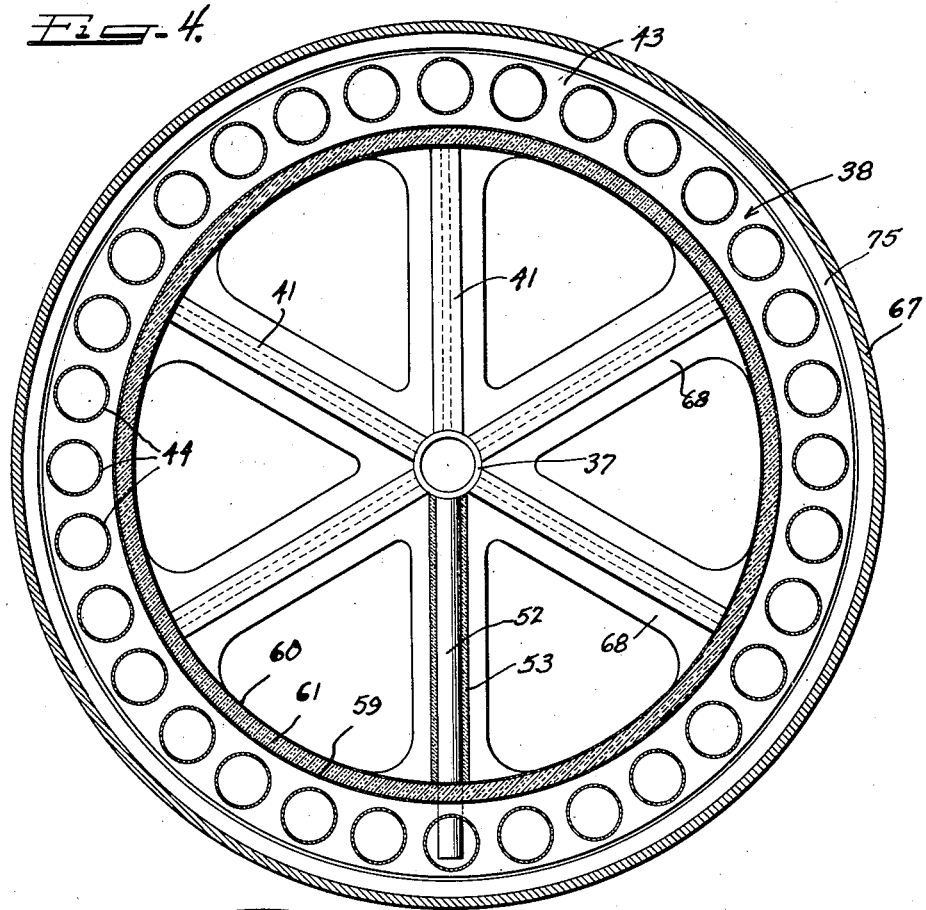
Figure 4 is a transverse vertical sectional view of the structure of Figure 3, taken substantially as indicated by the line IV—IV of Figure 3.

In Figures 3 and 4 I have illustrated a form of rotary drier in which the drier shell or drum is of greater diameter than that seen in Figures 1 and 2. With a shell of relatively large diameter certain features of construction are preferably changed over the small diameter drum, but the general operating principles remain.

With reference now to Figures 3 and 4, it will be seen that a suitable frame support 36 is used, which carries a hollow stationary shaft 37, the intermediate portion of this shaft being formed in the nature of a steam radiator or drum generally indicated by numeral 38. The shaft 37 is carried at one end on a fixed bearing 39, and at the other end on a roller support 40 to permit longitudinal movement due to expansion and contraction.

In this instance, the end walls of the steam drum 38 are annular in character, and the intermediate portion of the drum is open. This intermediate portion is made up by a series of stationary T-shaped spokes 41 which at their outer ends carry an annular double-walled header 42 on the intake side and a similar header 43 on the condensate side. Extending between the headers and in open communication with both of the headers 42 and 43 is a circumferential series of steam tubes 44 of similar construction as the tubes 10 previously described. On the intake end of the drum, a pair of diametrically opposed spokes are in the form of pipes 45, preferably covered by insulation 46 to avoid unnecessary dissipation of heat. These opposed pipes 45 communicate through suitable apertures 47 to the inside of the right half portion of the hollow shaft 37 and consequently with a steam inlet pipe 48. The hollow shaft 37 is plugged at each end around the steam pipe 48 as indicated at 49 and 50, and suitable heat insulation material 51 is packed around the steam inlet pipe 48.

At the opposite or condensate end of the steam radiator the vertically downwardly extending spoke is in the form of a condensate pipe 52, preferably encased in insulation 53. This communicates through a suitable opening 54 with the interior of the other portion of the shaft 37 and consequently with a condensate outlet pipe 55. This portion of the shaft 37 is also packed at one end as indicated at 56, and packed around the outlet pipe 55 at the inner end as indicated at 57, with suitable heat insulation 58 surrounding the pipe within the shaft 37.

Steam will therefore enter the pipe 48, pass through the apertures 47, through the opposed pipes 45—45, and into the header 42. The steam will then pass through all of the steam tubes 44 to the opposite header 43. Condensate will flow around the upper annular portion of the header 43 and accumulate in the lower part of this header as well as in the lowermost steam tube 45 and possibly one or more adjacent steam tubes. In this position, however, the collected condensate is in the form of a quiet pool and may readily be syphoned through the pipe 52, the inner end of the shaft 37, and the pipe 55. As in the previous case, there is no need for any steam joints or special packing glands, since all of the parts carrying steam are stationary and all steam connections may be permanent.

In view of the fact that the steam radiator is relatively of large diameter, and there are numerous steam pipes 44, all of which are spaced as nearly as possible at the circumference of the radiator or drum and in effect form the body portion of the drum, means are provided to concentrate the heat within the steam drum at the circumference of the drum. To this end, an insulation cylinder is formed immediately inside the steam tubes 44. This insulation cylinder comprises a pair of relatively thin walls 59 and 60 spaced apart to accommodate heat insulating packing 61 therebetween. The walls may be welded or similarly secured to the inside wall of each of the headers 42 and 43. It will also be noted that each of the walls 59 and 60 going to make up the insulation cylinder are preferably provided with expansion joints 62 and 63 respectively, and these expansions joints are, of course, preferably staggered so as not to be in the same plane. Thus, if the steam cylinder expands, the insulation cylinder may likewise expand. The insulation cylinder inside the steam tubes 44 prevents dissipation of heat through the central part of the drum and effectively concentrates the heat at the circumferential part of the drum within the tubes 44 where it will be most effective for the purposes desired.

The rotary or movable mechanism embodied in the structure of Figures 3 and 4 includes a hollow sectional shaft 64 carried in suitable bearings 65 and 66 mounted upon the frame support 36, which shaft surrounds the aforesaid fixed shaft 37 in spaced relationship thereto. The central portion of the shaft 64 is made up of the drier shell proper which includes an outer cylindrical drum or shell 67 carried by a ring of radial spokes 68 at each end. These spokes are attached to the sections of the shaft 64.

Adjacent the outer ends of the spokes 68 at each end of the shell 67 an inwardly extending imperforate flange 69 is provided which extends inwardly preferably a distance just beyond the inside wall 60 of the insulation cylinder associated with the steam drum. Inside each of these flanges 69 and attached to the inner surface of each flange is a closed annular housing 70 containing heat insulation material 71.

This construction, of course, concentrates the heat against the inner face of the shell 67. In order to further insure such concentration of heat, an annular resilient seal 72 is mounted on the outer wall of each of the headers 42 and 43. The sealing rings 72 mounted on each end of the steam drum by their own resiliency bear against the inner wall of the insulation housings 70—70 carried by the rotary shell 67, and function in the manner of metallic weather stripping.

For driving the rotary shell 67, a suitable driving gear 73 may be attached in any desirable manner as indicated at 74 to the set of spokes 68 at one end of the drum, as seen clearly in Figure 3. This driving gear may, of course, be operated by any suitable form of driving mechanism.

As in the case of the previously described embodiment of this invention, the shell 67 may be provided with inside reinforcing rings 75, if so desired or deemed necessary. This drum 67 already has an inside finish and may be of relatively thin material, preferably steel, so as to possess a high heat conductivity, and maintain lightness in weight for driving economy. There is no internal pressure in the shell 67, and consequently no danger of explosion. The slight braking action of the sealing rings 72—72 is so small as to be of no moment. It will also be noted that effective heating of the shell 67 is had at all times with a minimum of loss due to dissipation by virtue of the concentration of heat at the circumference of the stationary steam radiator 38. All of the advantages explained hereinabove in connection with the showing in Figures 1 and 2 are also available with the structure just above described in connection with Figures 3 and 4.

From the foregoing, it is apparent that I have provided a novel rotary drier construction in which the safety factor is effectively brought to a maximum. In the instant invention, all the steam connections may be permanent, and all parts carrying steam are stationary, thus eliminating steam joints, special packing, and the like, and facilitating the ready removal of condensate at any and all times from a quiet pool of condensate and with no power loss due to braking action by condensate. It will be noted that the rotary shell, which actually contacts the substance to be dried already carries an inside finish thus eliminating any special operation to acquire it, may be of relatively thin material with high heat conductivity and is extremely light in weight. The shell, further, has no internal pressure and consequently need only be of such strength and weight as to support itself and the relatively negligible weight of the substance to be dried. It will therefore be noted that with the construction embodied in this invention, economy of operation is brought to a maximum degree, and with the insulation arrangement the heat is concentrated where most needed, thus adding to the economy of operation. In addition, it will be noted that the entire structure, wherever possible, is preferably made of welded steel so that the construction is durable, readily installed, highly efficient in operation, and may be economically manufactured.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a drier construction, a steam radiator including an annular header at each end, means supporting said headers, a circumferential series of steam tubes extending axially of the radiator and connecting said headers, a double-walled cylinder inside said series of steam tubes, heat insulation in said double-walled cylinder and a rotary drying drum surrounding said steam radiator, insulation means on said drum opposite the ends of said steam tubes, and resilient sealing means carried by each said header and disposed for slidable contact with the end portions of said drum.

2. In a drier construction, a stationary steam radiator arrangement, a rotary drying drum arrangement surrounding said radiator and having end walls extending radially inwardly over the ends of said radiator, and resilient sealing means carried by one of said arrangements at each end thereof to contact the other arrangement at all times in the region of the radial extension of the walls of the drying drum arrangement to lessen heat loss.

3. In a drier construction, a stationary radiator including a pair of headers with a circumferential series of separate steam tubes extending longitudinally of the radiator therebetween, a double-walled insulating cylinder inside said series of tubes, a rotary drying drum around said series of tubes, radially extending reinforcing fins inside said drum, and double-walled insulating ends on said drum extending radially inwardly over the headers of said tubes.

4. In a drier construction, a stationary steam radiator including a header at each end, means supporting said headers, a circumferential series of separate steam tubes extending axially of said radiator and connecting said headers, said supporting means being arranged to permit free expansion and contraction of said steam radiator, a relatively light and thin rotary drying drum surrounding said radiator, radially extending reinforcing ribs inside said drum to withstand pressure on the outside surface of said drum, and a double-wall construction at the ends of said drum filled with insulation means and extending inwardly over said headers and the ends of said tubes, means to supply steam to one of said headers, and means associated with the opposite header to remove condensate.

FRANCIS A. HELIN.